United States Patent [19]

Holtkamp, Jr.

[11] Patent Number: 5,860,249
[45] Date of Patent: Jan. 19, 1999

[54] PLANT WATERING CONTAINER

[75] Inventor: Reinhold Holtkamp, Jr., Nashville, Tenn.

[73] Assignee: International Plant Breeding AG, Bern, Switzerland

[21] Appl. No.: 662,136

[22] Filed: Jun. 12, 1996

[51] Int. Cl.⁶ ................................................. A01G 31/02
[52] U.S. Cl. ................................................. 47/81; 47/79
[58] Field of Search .................. 47/81 N, 79 N, 47/41.01, 81, 79, 65.5

[56]     References Cited

U.S. PATENT DOCUMENTS

| | | | |
|---|---|---|---|
| 4,244,147 | 1/1981 | Geddes | 47/81 N |
| 4,343,109 | 8/1982 | Holtkamp | 47/81 |
| 4,434,577 | 3/1984 | Holtkamp | 47/81 |
| 4,903,432 | 2/1990 | Velagaleti et al. | 47/81 S |
| 4,932,159 | 6/1990 | Holtkamp, Sr. | 47/81 |
| 4,996,792 | 3/1991 | Holtkamp, Sr. | 47/81 |
| 5,111,614 | 5/1992 | Holtkamp, Sr. | 47/81 |
| 5,193,305 | 3/1993 | Holtkamp, Jr. | 47/81 |
| 5,477,640 | 12/1995 | Holtkamp, Jr. | 47/81 N |
| 5,491,929 | 2/1996 | Peacock et al. | 47/84 |

FOREIGN PATENT DOCUMENTS

| | | | |
|---|---|---|---|
| 359723 | 3/1938 | Italy | 47/79 N |

*Primary Examiner*—Terry Lee Melius
*Assistant Examiner*—Joanne C. Downs
*Attorney, Agent, or Firm*—Foley & Lardner

[57]     ABSTRACT

A plant watering container assembly comprising a bottom container section having side and bottom walls defining a water reservoir, and a top container section removably connected to said bottom container section. The top container section includes an integrally formed funnel-shaped section having a side wall extending downwardly toward said reservoir and defining a conical opening for receiving a side wall of a potted plant, and further having an integrally formed annular bottom wall defining at its radially inner edge a central opening through which a watering wick can pass downwardly into the reservoir. In the event the container is tipped or turned, water in the container reservoir is trapped in an annular chamber defined by the wall of the funnel and the top and bottom container sections, thereby precluding water passing outwardly through the central opening of the funnel-shaped section.

8 Claims, 1 Drawing Sheet

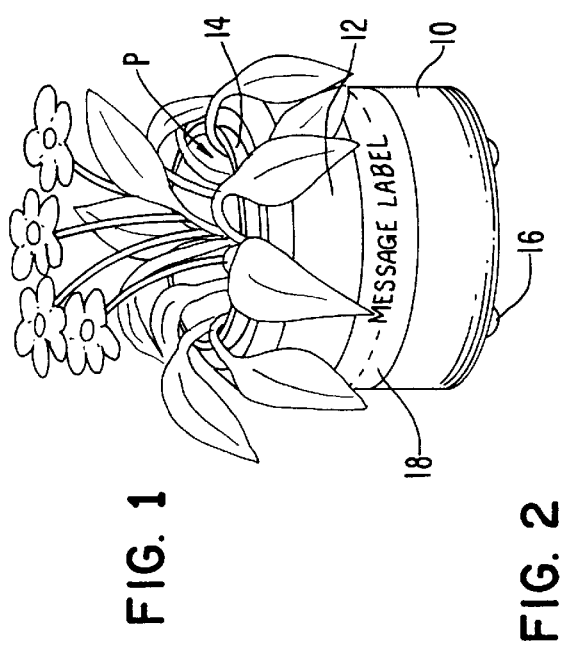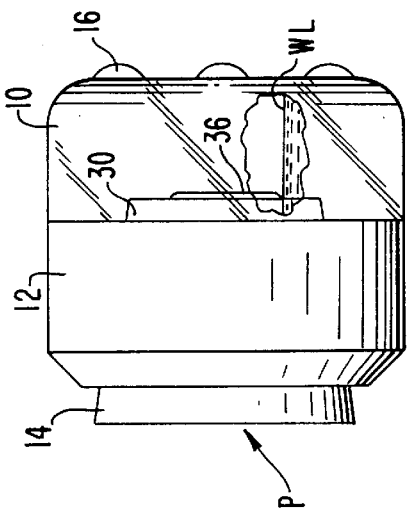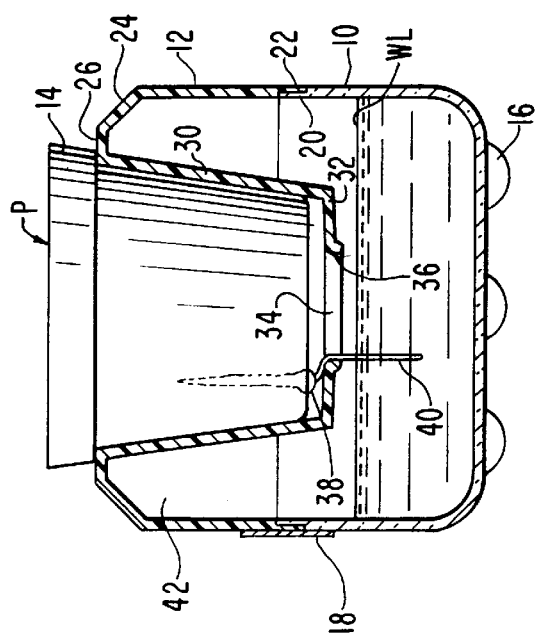

PLANT WATERING CONTAINER

BACKGROUND OF THE INVENTION

The present invention relates as indicated to a plant watering container, and more particularly to a container which can be partially filled with water prior to shipping and is able to accommodate tilting or tipping of the container without spillage during transportation.

There are numerous plant watering systems for systematically supplying water or nutrient-enriched water from a reservoir to the bottom of a pot by capillary action. Many plant species, for example, African violets, clearly prefer bottom watering. Top water tends to result in overwatering of the plant, whereas bottom watering, if properly performed, tends to provide a consistent and adequate supply of moisture to the growing media for the plant without the adverse effects or potential for overwatering.

In standard approximately 4" pots, bottom watering of African violets was provided for in U.S. Pat. Nos. 4,343,109 and 4,434,577, issued to Reinhold Holtkamp, Sr. In each of those patents, a water absorbing pad was positioned between the pot and a support member, with the pad including a tab portion extending into a water reservoir for transmitting water by capillary action through the pad into the bottom of the pot. Although such arrangements perform very satisfactorily for pots 4" or larger in diameter, they are not designed for miniaturized pot containers.

Pot miniaturization has developed for numerous species, including African violets. Miniaturized pots, approximately 1.25" up to 2.25" in pot diameter at the top thereof, have been very popular with consumers, and special African violet breeding programs have been developed to miniaturize plants for these pots in such a manner that the plants are proportional in every respect to plants much larger. These miniaturized pots present special problems for bottom watering, and special containers for that purpose have been designed and have achieved considerable commercial success and acceptance. U.S. Pat. Nos. 4,996,792 and 5,111,614, also issued to Reinhold Holtkamp, Sr., disclose watering containers which comprise separate but interengageable upper and lower container sections. The lower section defines a water reservoir, with the upper container section being formed with a central opening to receive and support the miniature pot. The plant is watered by means of a wick which extends from the growing media in the pot downwardly into the water reservoir whereby water is transferred by capillary action up into the growing media to provide moisture for the plant.

In U.S. Pat. Nos. 4,996,792 and 5,111,614, a central opening is formed in the top wall of the upper container section, and the miniature pot is formed with an annular flange which engages the portion of the top wall surrounding and defining the central opening. One or more watering wicks are provided, with the lower end of the or each wick extending into the water reservoir, and the upper end of the wick engaging and being retained by a wick holding device which extends upwardly through an opening in the bottom wall of the pot into the growing media. Various wick holding and insertion devices have been devised for that purpose, with two such devices being disclosed in U.S. Pat. Nos. 4,932,159 and 5,193,305.

Although miniature potted plants and watering containers can be separately supplied to the wholesaler or retailer, it is desirable to assemble the plant with the container. Similarly, although water can be added to the container by the wholesaler or retailer, it is more desirable to provide the water supply at the time of assembly so as to ensure satisfactory watering of the plants during transportation and during handling of the plants and containers for display. This requires that the wick and wick holding device be inserted in the growing media in the pot, and that the wick extend downwardly into the water reservoir when the plant pot and container are assembled. This not only ensures adequate watering during the shipping and handling process, but eliminates the time-consuming need for the recipient, e.g. a retailer, to assemble the wick with the pot, the pot with the container, and to make certain that adequate water is added to the reservoir. Pre-assembly and watering permits the retailer to immediately display the plants and containers while the plant is in optimum condition. This is critically important to the marketing effort.

Although pre-assembling and watering does provide several advantages as noted above, there are also potential problems. With previous containers, it was very important that the container and potted plant be kept generally upright. Tilting or entirely tipping the container onto its side could result in the pot being separated from the upper container section, with the plant itself possibly being separated from the pot. The tipping also caused water in the reservoir to leak outwardly of the upper container section if the water in the reservoir was filled above a fairly low level. Since numerous plants and containers are normally shipped in a single shipping container, the tilting, or tipping of the containers onto their sides, could result in the damage or loss of the entire shipment, or require at the very least replacement of those plants damaged during shipment.

The plant watering system of the invention disclosed in my pending application Ser. No. 08/352,078 attempts to solve the leakage problem resulting from turnover by providing in the upper container section a downwardly directed funnel-shaped wall complementary to the shape of the side wall of the pot and surrounding the same when the pot is mounted in the upper container section. The funnel-shaped wall is open at its bottom and extends downwardly below the bottom wall of the pot. This arrangement provides a continuous annular wall positioned much closer at its bottom to the vertical axis of the container, as a result of which greater amounts of water can be stored in the reservoir before leakage occurs if the container is tipped on its side.

Another arrangement designed to overcome the problem of leakage resulting from tipping of pre-assembled, watered containers is disclosed in U.S. Pat. No. 5,491,929. The container assembly disclosed therein comprises upper and lower halves rigidly secured together. The upper half is formed with a re-entrant structure comprised of a side wall which is conical or funnel-shaped and complemental to the angularity of the outer walled surface of the pot to be supported by the container. The side wall of the re-entrant structure is open at the top thereof to receive the pot flange, and also at the bottom thereof. In the preferred form disclosed, the height of the conical wall is less than the side wall of the pot which it supports, and the vertical dimension of the conical wall is substantially less than one half the vertical dimension of the assembled container halves. This greatly limits the depth of water in the reservoir which can be accommodated during transportation and shipping, while still being able to preclude leakage of water in the event the container is fully tipped on its side. Although the patentee contemplated a longer conical re-entrant wall, it is clearly recognized and described that with such longer wall structure, substantially less water can be accommodated in the reservoir before spilling out over and through the conical re-entrant wall and consequently outwardly of the container.

A further described feature of the container illustrated in U.S. Pat. No. 5,491,929 is the bonding of the two container halves in order to provide a container that will not leak through the connecting joint. Ultrasonic bonding is described as being preferred, although chemical or mechanical techniques could be employed. Although such bonding provides the desired advantage of leakage avoidance during shipping and handling, it has the distinct disadvantage of precluding separation of the container halves or sections by the retailer or ultimate consumer. As a result, in order to replenish the water supply, the pot must be removed from its supported position. Since the conical re-entrant wall tightly frictionally receives the pot, it is potentially difficult to remove the pot without damaging the plant. Moreover, rigidly connecting the container halves results in significant aesthetic and sanitary disadvantages. Algae and dirt particles frequently are present in the reservoir water thereby discoloring the same. Since there is no direct access to the bottom container half except through the open lower end of the re-entrant wall, the reservoir walls are cleaned very infrequently, and then with great difficulty.

SUMMARY OF THE INVENTION

A feature of the invention is the provision of a separable two section container wherein the upper container section is formed with a downwardly directed funnel-shaped supporting wall for the potted plant. In accordance with a preferred form of the invention, the funnel terminates at its bottom end below the pot supported in the funnel, with the funnel having a generally horizontal bottom wall spaced from the pot to accommodate a wick insertion device in such space. The bottom wall of the funnel is formed with a central opening through which the watering wick can extend downwardly into the reservoir. The vertical dimension of the space between the pot and the bottom wall of the funnel is such that one or more wick insertion devices at various locations in the bottom of the pot can be easily accommodated.

The bottom wall of the funnel is sloped downwardly and inwardly toward the central opening, thereby enhancing drainage through the central opening. The bottom wall also provides a support surface or ledge to collect particles falling through the drainage openings in the bottom of the pot. This minimizes particles falling into the reservoir and discoloring the water.

A further important feature of the invention is the ability of the container to be tipped or tilted without water flowing into the pot and consequently out of the container. This is accomplished by properly dimensioning the upper and lower container sections, and the sides and depth of the funnel. It has been found that by increasing the diameter of the upper and lower container sections only slightly when compared to existing containers for miniature pots, approximately 50% more water can be contained in the reservoir and, most importantly, water leakage prevented when the container is tilted or tipped completely on its side. This results in the important advantage of being able to provide substantially greater amounts of reservoir water during shipping and initial handling, while simultaneously being able to accommodate tipping or tilting of the container during those periods.

The two-section container construction comprises upper and lower separable sections which are formed with opposite, interengaging flanges. However, the upper section can be easily removed when it is desired to replenish the water supply in the reservoir defined by the lower container section, or when it is desired to clean the bottom container for sanitary or aesthetic reasons. When the upper container is removed, the plant pot can remain in the upper container thus avoiding the need of the user to handle and potentially damage the plant during water replenishment. In order to maintain the container sections in place during the shipping and handling prior to display for sale, an adhesively backed message label extends around the container in the region of the interengaging flanges thereby to prevent separation of the upper container section from the lower section until the label is removed. Special messages can be printed on the label for promotions or seasonal sales, and the label can be removed by the purchaser to permit lifting of the upper container section for water replenishment.

These and other objects of the invention will become apparent as the following description proceeds in particular reference to the application drawings.

BRIEF DESCRIPTION OF THE DRAWINGS

FIG. 1 is a perspective view of the container of the invention, supporting a potted plant and having a message label around the exterior of the container sections;

FIG. 2 is a vertical cross-sectional view through the container, showing more clearly the funnel portion of the upper container section. For purposes of clarity, the plant and growing medium have been removed from the pot; and FIG. 3 is a side elevational view showing the container tipped on its side, and partially broken away to illustrate how water at the level shown in FIG. 2 is accommodated when the container is tipped, without leakage of water through the central funnel opening.

DETAILED DESCRIPTION OF THE PREFERRED EMBODIMENT

Referring now in more detail to the application drawing, wherein like parts are indicated by like reference numerals, and initially to FIG. 1, the container of the present invention comprises a lower container section 10 and an upper container section 12. The latter supports the flange 14 of a pot generally indicated at P, which contains a miniaturized plant shown schematically in that figure. The lower container section 10 has formed on its bottom wall a plurality of projecting feet 16 which serve to space the container from the supporting surface and prevent the collection of moisture on such surface.

The container sections 10 and 12 are releasably interconnected as will be presently described, and can be releasably retained in their assembled positions as shown in FIG. 1 by means of a message label 18 which can be adhesively secured around the connecting portions of the upper and lower container sections prior to packing and shipping. The sections thus remain connected in the event the container is tipped during transportation and handling. The message label can carry appropriate wording, for example, seasonable messages, or information or advertising for the plant. After purchase by the consumer, the label can be removed thereby enabling the upper container section to be removed from the lower container section for water replenishment as will be presently described.

Referring to FIG. 2, the lower section 10 is formed with an inwardly offset continuous upper flange 20, with the offset being dimensioned to receive a downwardly depending bottom flange 22 formed on the upper container section 12. The flanges are dimensioned so that the upper container section frictionally fits snugly on the lower container section but can be removed when it is desired to replenish the water supply in the reservoir defined by the lower container section 10. The provision of the message label 18 is particularly useful, since the container is preferably shipped with a maximum supply of water (WL in FIG. 2) to maintain the quality of the plant during shipping. Once purchased, the label can be removed since tilting or tipping is no longer a problem.

The upper container section 12 terminates at its upper end in an annular bevelled wall 24 and a horizontal top wall 26 having an annular area sufficient to support the annular bottom surface of the pot flange 14.

Integrally formed with and extending downwardly from the top wall 26 is a funnel-shaped wall 30 including an integrally formed bottom wall 32 in which is formed a central opening 34 defined by a downwardly turned annular lip 36. The angularity of the wall 30 generally corresponds to the taper of the pot P, although it is preferred that the pot be primarily supported by the flange 14 of the pot engaging the top wall 26. This reduces the close tolerances otherwise needed between the pot and funnel walls, with less than exact tolerances resulting in the pot being entirely supported by the funnel wall. This in turn can lead to a tight frictional fit between the pot and the funnel wall which inhibits movement of the pot relative to the funnel wall. If the pot is supported by top wall 26, the funnel can more loosely receive the side wall of the pot thereby facilitating movement or lifting of the pot from the upper container section.

It will be noted that the length of the wall 30 is such that the bottom wall 32 is spaced from the bottom wall of the pot when the pot is mounted in the container. This permits a wick insertion device 38 to be received in such space and enables the wick 40 carried by the device 38 to extend downwardly through central opening 34 into the reservoir. The wick insertion device per se forms no part of the present invention, and devices such as those disclosed in U.S. Pat. Nos. 4,932,159 and 5,193,305 can be satisfactorily used. Although one wick insertion device is shown in FIG. 2, it will be understood that more than one could be provided, and that the device or devices could extend through the bottom wall of the pot in locations other than as shown in FIG. 2. The spacing between the bottom wall of the pot and the bottom wall 32 readily accommodates such variation.

The function of the wick is well known and will not be described in detail other than to state that watering requirements of certain plants, for example African violets, can be satisfied by bottom watering utilizing one or more wicks by means of which water is transmitted to the plants by capillary action. The amount of water transferred can be varied as necessary by the number and diameter of the wicks. Bottom watering is particularly important for miniaturized plants where top watering presents practical problems due to the density of the plants and the small diameter of the pot.

The bottom wall 32 of the funnel has a slight downward and inward taper to enhance drainage, for example, when water is replenished by removing the pot but not the upper container. The wall 32 provides several important advantages. The depth of water in the reservoir can be substantially increased and water nevertheless precluded from leaking outwardly through the central opening 34 in the event the container is tipped entirely on its side as shown in FIG. 3. The wall 32 also serves to collect particles of peat moss or other growing media which escape through openings in the bottom wall of the pot which accommodate the wick insertion device or devices 38. In that regard, the bottom wall of the pot is typically provided with drainage holes and with a plurality of circumferentially spaced openings for receiving one or more wick insertion devices. However, to the extent that any particles may migrate downwardly through such openings, they will collect on the top surface of the bottom wall 32 which prevents the same from entering the reservoir and discoloring the water.

The lip 36 serves to direct water and the wick or wicks centrally into the reservoir, and serves as an additional barrier to leakage outwardly through the funnel.

The lower container section 10 and the upper container section 12, including the funnel 30, are preferably formed of plastic material. The bottom section 10 is preferably transparent in order to be able to readily detect the water level in the reservoir. The upper container section 12 can also be transparent, although it is preferably opaque in order to hide the main wall of the pot and the funnel support therefor, and to provide a pleasing contrast with the transparent bottom section.

FIG. 2 shows a maximum water level WL which can accommodate tipping of the container entirely onto its side as shown in FIG. 3, without water entering and passing outwardly through the central opening 34. It will be noted in FIG. 3 that the water level extends upwardly to the bottom-most portion of the lip 36 without draining through the central opening 34 and outwardly of the container through the pot P. An annular chamber 42 (FIG. 2) is defined by the upper container section 12 and the outer surface of the wall 30 of the funnel, with the chamber accommodating the water when the container assembly is tipped to its FIG. 3 position.

It has been discovered that by properly proportioning and dimensioning the container sections, and providing the funnel with its bottom wall 32, substantially greater amounts of water volume can be accommodated without leakage. This results in the important advantage that a maximum water supply can be initially provided at the time of assembling and packing, thus providing a longer period of time for shipping and handling before water replenishment is necessary.

For example, it has been discovered that with the funnel configuration shown in FIG. 2, and an outside diameter of approximately 72–74 mm for both the upper and lower container sections 10 and 12, water filled to the water level shown in FIG. 2 can be accommodated in the event the assembly is tipped to its FIG. 3 position during shipping, without water passing outwardly through opening 34. The overall height of the container assembly shown (excluding the feet 16) is approximately 64–65 mm. Based on those height and diameter dimensions, the diameter of the funnel wall 30 at the top thereof is preferably approximately 48 mm, the diameter of the central opening 34 in the wall 32 is approximately 18 mm, and the height of the wall 30 is approximately 40 mm. Although those dimensions are not critical, it has been established that such dimensional relationship does provide the ability to accommodate a substantially greater volume of water without posing leakage problems, as shown by the maximum water line WL in FIG. 2.

Tests have shown that in accordance with the present invention, the maximum water volume is approximately 50% greater compared to containers of the type shown in U.S. Pat. No. 5,491,929. In other words, by increasing the diameter of the container sections approximately 10% and by providing the bottom wall 32, an increase in the maximum water volume (without leakage) of approximately 50% is obtained. This is a very important difference in the use environment of the present invention.

The numerous advantages provided by the present invention should be apparent from the forgoing description.

Substantially more water can be supplied to the reservoir and yet tipping of the container accommodated without leakage. The funnel bottom wall is spaced from the pot a sufficient distance to accommodate a wick insertion device or devices which position wicks in the growing media in the pot. The separable container sections can be temporarily maintained connected during shipment and thereafter made separable so that the user can remove the upper container section for water replenishment without the need for handling or disturbing the pot mounted in the upper section.

What is claimed is:

1. A plant watering container comprising:

a lower container section having side and bottom walls defining a reservoir for supplying water by capillary action to a potted plant having a watering wick, an upper container section removably connected to said lower container section, said upper container section including a side wall, a top wall supporting the flange of a pot, and an integrally formed funnel-shaped section having a side wall extending downwardly toward said reservoir and defining a conical opening for receiving a side wall of a potted plant, said funnel-shaped section being spaced from the side walls of said upper and lower container sections so as to define therewith an annular chamber, said funnel-shaped section further comprising an integrally formed annular bottom wall connected at its radially outer portion to said side wall of said funnel-shaped section and defining at its radially inner edge a central opening through which a watering wick can pass downwardly into the reservoir, whereby water which may accumulate near the funnel-shaped section, in the event the container is tipped or turned, is trapped in said annular chamber thereby precluding water passing outwardly through said central opening of said funnel-shaped section, said lower container section being open at the top and said side wall of said lower container section being formed with a continuous mounting flange at the upper end thereof, said side wall of said upper container section being formed with a continuous mounting flange at its bottom, with said continuous mounting flanges of said upper and lower container sections being cooperatively configured and dimensioned to form continuous interengagement surfaces when said upper container section is positioned over the lower container section to form an assembled container, said upper container section being removable from said lower container section for replenishing the water supply in said reservoir without contact with the potted plant mounted in said upper container section, and means for temporarily securing together said mounting flanges of said lower and upper container sections thereby to prevent separation of said upper container section from said lower container section during shipping and handling, said means for temporarily securing said upper and lower container sections comprising an adhesively backed label extending around said upper and lower container sections at the region of the interconnection of the mounting flanges of said upper and lower container sections thereby preventing separation of such flanges, said label being removable by the purchaser thereby reestablishing the separability of the upper container section from the lower container section for water replenishment.

2. A plant watering container comprising:

a lower container section having side and bottom walls defining a reservoir for supplying water by capillary action to a potted plant having a watering wick, and an upper container section removably connected to said lower container section, said upper container section including a side wall, a top wall supporting the flange of a pot, and an integrally formed funnel-shaped section having a side wall extending downwardly toward said reservoir and defining a conical opening for receiving a side wall of a potted plant, said funnel-shaped section being spaced from the side walls of said upper and lower container sections so as to define therewith an annular chamber, said funnel-shaped section further comprising an integrally formed annular bottom wall connected at its radially outer portion to said side wall of said funnel-shaped section and defining at its radially inner edge a central opening through which a watering wick can pass downwardly into the reservoir, said bottom wall of said funnel-shaped section being slightly sloped to facilitate drainage to said central opening, and said radially inner edge of said bottom wall of said funnel section being formed with a downwardly turned lip having a smooth but curved surface, whereby water which may accumulate near the funnel-shaped section, in the event the container is tipped or turned, is trapped in said annular chamber thereby precluding water passing outwardly through said central opening of said funnel-shaped section.

3. A plant watering container comprising:

a lower container section having a vertical side wall and a bottom wall defining a reservoir for supplying water by capillary action to a potted plant having a watering wick, and an upper container section mounted on said lower container section, said upper container section including a vertically extending side wall comparable in vertical dimension to the side wall of said lower container section, a top wall, and an integrally formed funnel-shaped section having a wall extending downwardly toward said reservoir and defining a conical opening for receiving a side wall of a pot, the funnel-shaped section being spaced from the side walls of the upper and lower container sections so as to define therewith an annular chamber, the funnel-shaped section further comprising an integrally formed annular bottom wall connected at its radially outer portion to the wall of the funnel-shaped section and defining at its radially inner edge a central opening through which a watering wick can pass downwardly into the reservoir, whereby water which may accumulate near the funnel-shaped section, in the event the container is tipped or turned, is trapped in said annular chamber thereby precluding water passing outwardly through said central opening of said funnel-shaped section.

4. The plant watering container of claim 3 wherein said lower container section is open at the top and said side wall of said lower container section is formed with a continuous mounting flange at the upper end thereof, said side wall of said upper container section being formed with a continuous mounting flange at its bottom, with said continuous mounting flanges of said upper and lower container sections being cooperatively configured and dimensioned to form continuous interengagement surfaces when said upper container section is positioned over the lower container section to form an assembled container, with said upper container section being removable from said lower container section for replenishing the water supply in said reservoir without contact with the potted plant mounted in said upper container section.

5. The plant watering container of claim 3 further including means for temporarily securing together said lower and upper container sections thereby to prevent separation of said upper container section from said lower container section during shipping and handling, said means for temporally securing said container sections comprising an adhesively backed label extending around said container where the container sections are connected, said label being removable by the purchaser thereby reestablishing the separability of the upper container section from the lower container section for water replenishment.

6. The plant watering container of claim 3 wherein the pot includes a conically shaped side wall complemental to the angularity of said funnel-shaped section, and a bottom wall formed with at least one opening through which a wick insertion device can extend for embedding the watering wick in the growing media, and wherein, when said pot is supported in said upper container section, the bottom wall of said pot is spaced from said bottom wall of said funnel-shaped section to accommodate the wick insertion device.

7. The plant watering container of claim 3 wherein the overall width or diameter of said container, when said upper and lower container sections are assembled, exceeds the height of the container, and wherein the wall of said funnel-shaped section extends downwardly in the container substantially more than one half of the height of the container.

8. The plant watering container of claim 7 wherein the maximum water level of water in the reservoir, while still permitting tipping of the container entirely on its side without leakage of water outwardly of the container through said central opening, is relatively adjacent said bottom wall of said funnel-shaped section.

\* \* \* \* \*